G. MONGNE.
APPARATUS APPLICABLE TO RING SPINNING AND DOUBLING FRAMES OR THE LIKE.
APPLICATION FILED JULY 16, 1907.

910,838.

Patented Jan. 26, 1909.

6 SHEETS—SHEET 1.

G. MONGNE.
APPARATUS APPLICABLE TO RING SPINNING AND DOUBLING FRAMES OR THE LIKE.
APPLICATION FILED JULY 16, 1907.

910,838.

Patented Jan. 26, 1909.

6 SHEETS—SHEET 2.

WITNESSES

INVENTOR
Georges Mongne
BY

ATTORNEYS

G. MONGNE.
APPARATUS APPLICABLE TO RING SPINNING AND DOUBLING FRAMES OR THE LIKE.
APPLICATION FILED JULY 16, 1907.

910,838. Patented Jan. 26, 1909.
6 SHEETS—SHEET 5.

FIC. 5

G. MONGNE.
APPARATUS APPLICABLE TO RING SPINNING AND DOUBLING FRAMES OR THE LIKE.
APPLICATION FILED JULY 16, 1907.

910,838.

Patented Jan. 26, 1909.

6 SHEETS—SHEET 6.

WITNESSES
Walter Abbr
L. H. Grote

INVENTOR
Georges Mongne
BY
Howson and Howson
ATTORNEYS

UNITED STATES PATENT OFFICE.

GEORGES MONGNE, OF DEVILLE, ROUEN, FRANCE.

APPARATUS APPLICABLE TO RING SPINNING AND DOUBLING FRAMES OR THE LIKE.

No. 910,838.      Specification of Letters Patent.      Patented Jan. 26, 1909.

Application filed July 16, 1907. Serial No. 384,119.

*To all whom it may concern:*

Be it known that I, GEORGES MONGNE, subject of the Republic of France, and residing at Deville, Rouen, France, have invented new and useful Improved Apparatus Applicable to Ring Spinning and Doubling Frames or the Like, of which the following is a specification.

This invention relates to an improvement in or applicable to ring spinning and doubling frames: The object of my said invention is to obtain an accelerating motion so as to enable the spindles to be run at an increased speed at any suitable period of the operation of a cop or bobbin being built, whereby the production of the spindles may be increased without undue strain to the yarn. When starting the yarn on the bare cop tube the angle of the thread passing through the spinning ring is quite acute—so that the spindle can be run at only a moderate speed without fear of breakage. As the cop bottom is built up, however, the angle of the yarn becomes less acute, and consequently the speed of the spindle may be accelerated without increasing the strain on the yarn. At the accelerated speed, the production of the spinning frame is of course increased. My invention aims to accomplish this.

Figure 1:
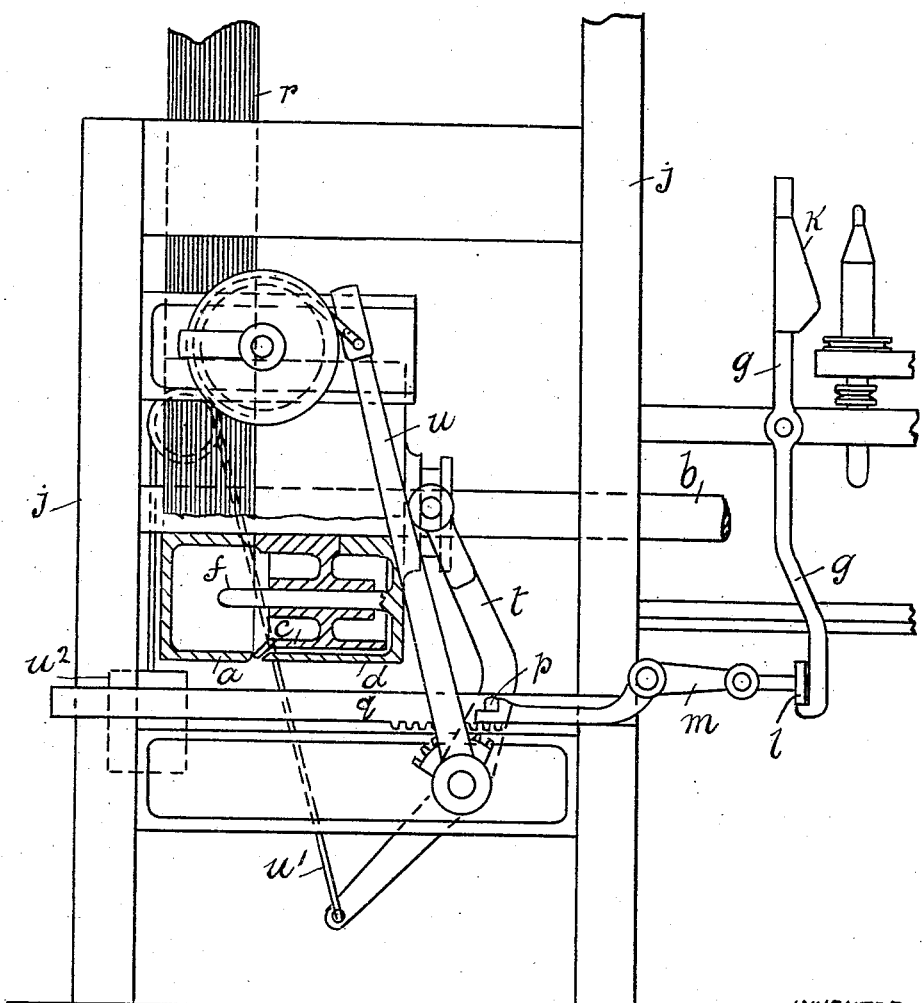
Figure 2:
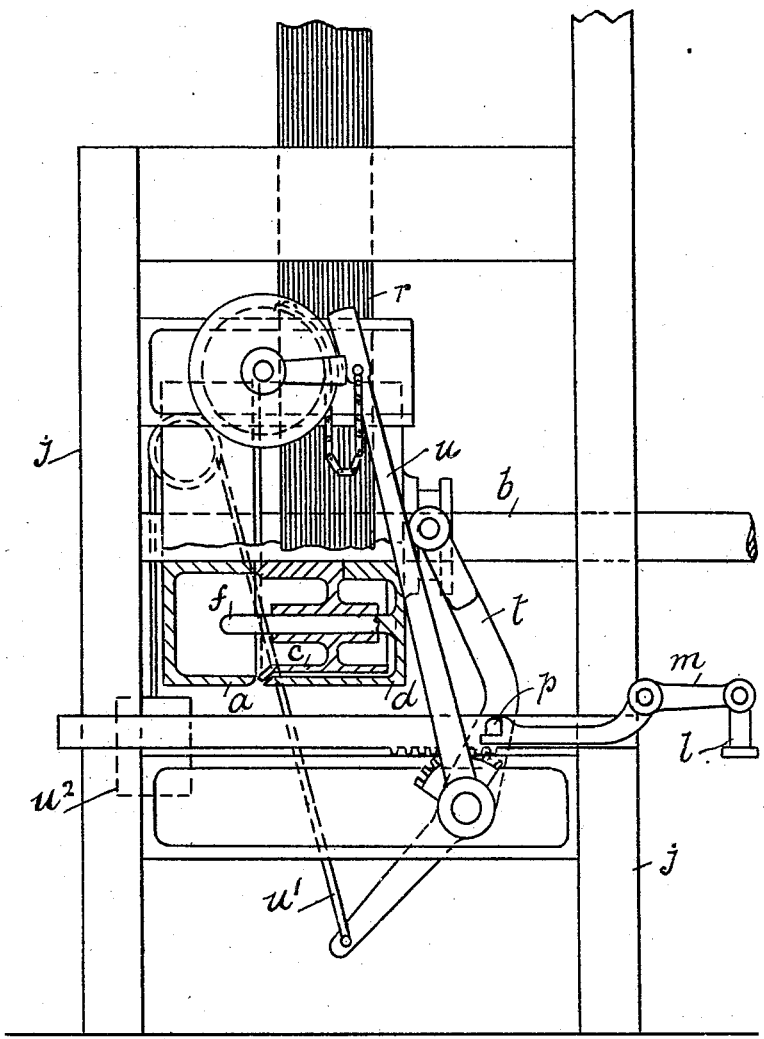
Figure 3:
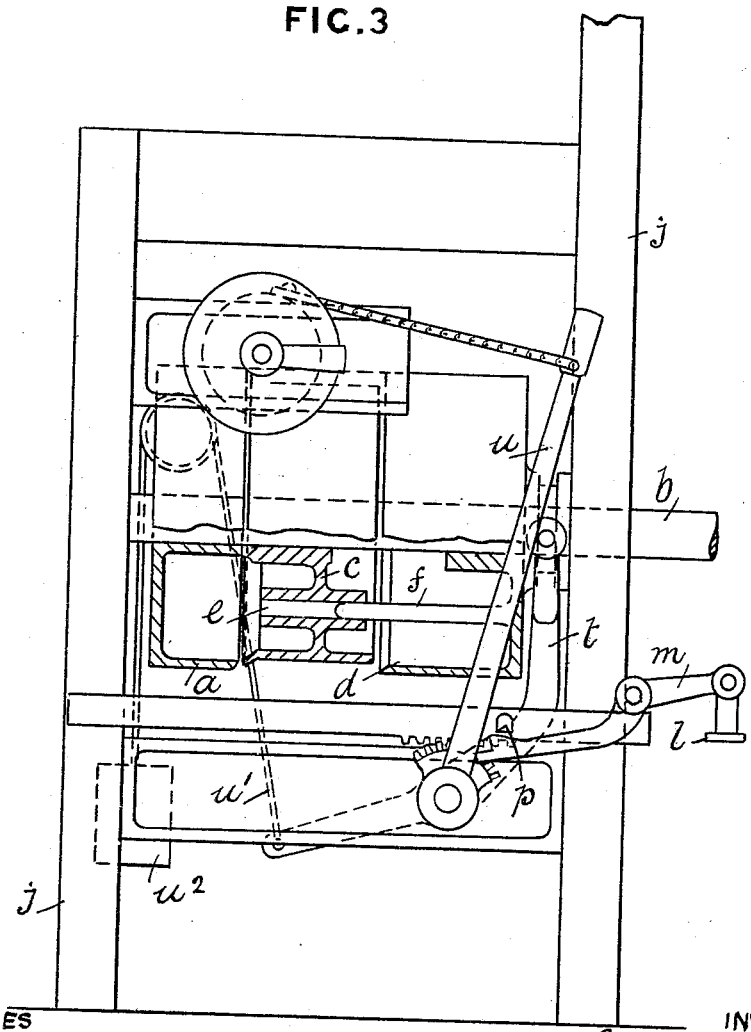
Figure 4:
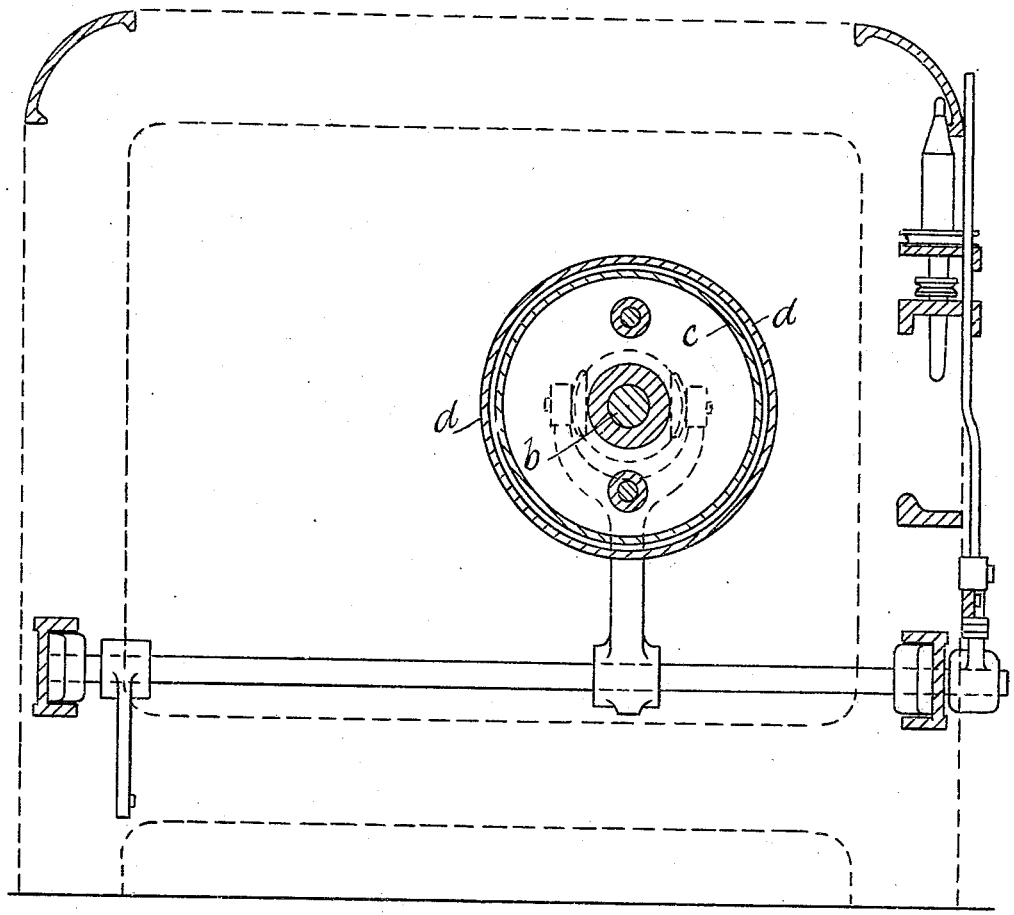
Figure 5:
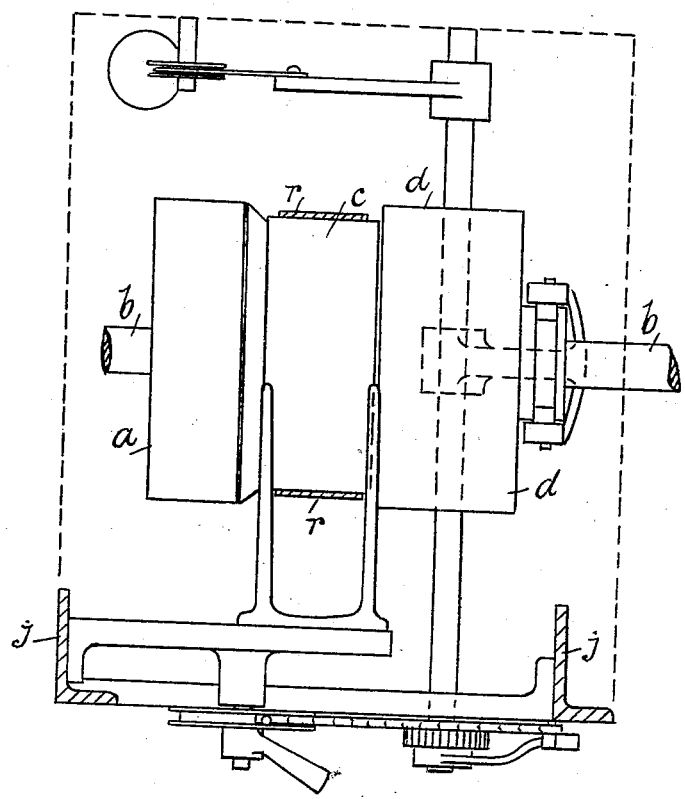
Figure 6:
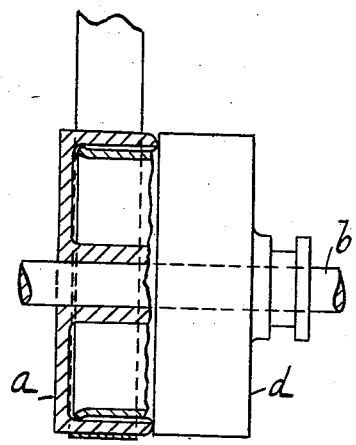
Figure 7:
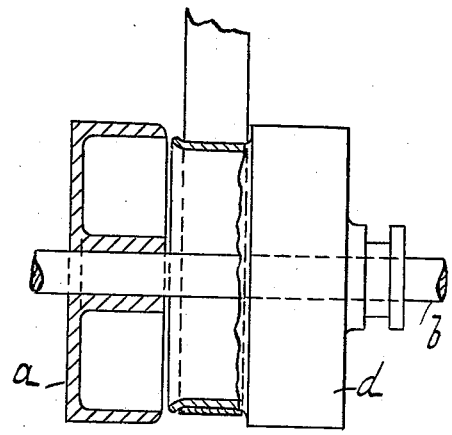
Figure 8:
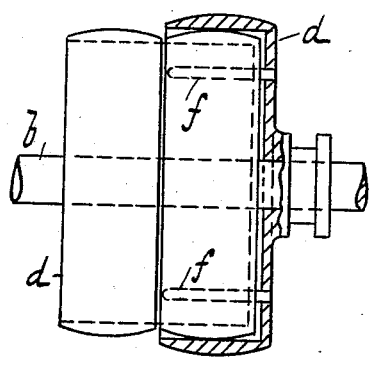
Figure 9:
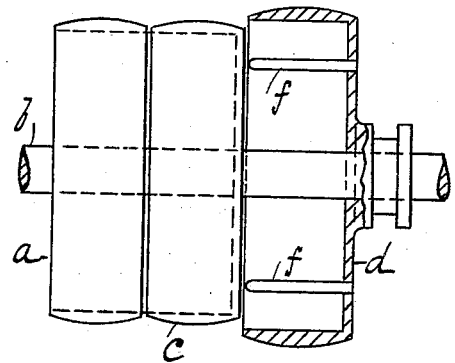

In the accompanying drawing illustrating my said invention and to which I hereinafter refer, Figure 1 is a front view, partly in section, of so much of a frame as is necessary to show the application of my invention: in this view the machine is shown at rest with the driving strap on the loose pulley. Fig. 2 is a like view showing the driving belt placed on an external pulley which slides loosely on the tin roller shaft but is made into a fast pulley by sliding over a pulley of lesser diameter that is keyed on the tin roller shaft, and temporarily connected to said lesser pulley by studs fitting into slots therein. Fig. 3 is a view of the same showing the external pulley withdrawn from the lesser pulley and the belt placed thereon. Fig. 4 is a transverse section on line A A Fig. 1, and Fig. 5 is a plan of Fig. 3. Figs. 6 and 7 are side elevations partly in section of a modified construction of the pulley, and Figs. 8 and 9 are similar views of another modification.

In these views the same letters refer to like parts.

According to and for the purpose of my said invention, and with reference to Figs. 1 to 5 on the accompanying drawings, I place on the tin roller shaft $b$ that has the ordinary loose pulley $a$ thereon, a combined fast and loose pulley consisting of a fast pulley $c$ of lesser diameter than the ordinary loose pulley $a$ and a pulley $d$ of the same diameter as the ordinary loose pulley $a$ placed loosely on the tin roller shaft $b$, but formed so as to slide over and be secured to the fast pulley $c$ by studs $f$ entering slots $e$ (Fig. 3) within said fast pulley or by other equivalent means.

A lever $g$ that is pivoted on the frame $j$ has an adjustable catch $k$ (Fig. 1) on its upper end, which can be set in any desired position, but preferably so as to act as soon as the bottom of the cop or bobbin is formed, when the ring rail rising will come into contact with said catch, causing the catch $l$ pivoted on the lever $m$ to be released and fall into the position shown in Fig. 2: the lever of the copping motion in its upward course will lift the catch $l$ as in Fig. 3, causing the opposite end of the lever $m$ to release the stud $p$ on the rack bar $q$: the lever $t$ will then draw the external pulley $d$ from under the strap $r$ by means of the lever $u$, the chain $u'$ and the weight $u^2$ the strap being then on the fast and lesser pulley $c$ thereby accelerating the speed of the frame.

Turning to the modification of the pulley shown in Figs. 6 and 7 it will be seen that instead of making the different sized driving pulleys independent, and sliding the larger pulley from its position over the smaller pulley, they are made integral or united side by side, and the smaller pulley, when the driving band is running on the larger pulley, extends inside the idler $a$. The movement of the lever $t$ slides both pulleys on the shaft $b$, to which they are suitably keyed, and the band drops around the smaller pulley to give the desired increased speed.

In the modification shown in Figs. 8 and 9 the arrangement is practically the same as that shown in Figs. 1 to 5 differing therefrom only in that the small pulley is made the same size as the idler $a$ while the larger pulley $b$ has a greater diameter in order to slide over the same.

The operation of the device may be readily understood from the above description. The weight $u^2$ being lifted and the catch $l$ engaged by lever $g$, the belt which is on the larger pulley is started and drives the cop spindle at the lower speed. As the cop bottom is formed, the ring rail rises and striking the beveled face of the catch $k$ throws the lever $g$ out of engagement with the catch $l$, thereby rendering the lever $t$ subject to the action of the weight $u^2$. As the weight descends, the lever $t$ shifts the pulleys beneath the belt and the latter falls upon the smaller pulley, thus increasing the speed of the cop spindle.

The construction may be variously modified without departing from my invention, and I do not limit myself to the arrangement shown.

I claim as my invention:—

1. A ring spinning machine having a plurality of driving pulleys of different diameters one of which is capable of movement lengthwise of the driving shaft, and means for shifting said movable pulley in combination with a cop building mechanism and means in connection therewith for setting in motion said pulley shifting means, substantially as described.

2. A spinning machine, having a plurality of driving pulleys of different diameters and means to shift said pulleys so that the driving band passes from one to the other in combination with a cop building mechanism and means in connection therewith for setting in motion the pulley shifting mechanism, substantially as described.

3. A spinning machine having a driving spindle, a plurality of driving pulleys of different diameters mounted thereon, means for changing the driving belt from one pulley to the other, a trip mechanism controlling said means, and means in connection with the spinning mechanism for operating said trip at a predetermined point in the spinning operation, substantially as described.

4. A spinning machine having a variable speed drive, and means for operating the change speed mechanism, a trip controlling the same in combination with a cop building mechanism and means in connection therewith for actuating the trip.

In testimony whereof I have signed my name to this specification, in the presence of two subscribing witnesses.

GEORGES MONGNE.

Witnesses:
 JAMES HOPE,
 GUSTAVE CAUDELIN.